(12) United States Patent
McMahon

(10) Patent No.: US 9,143,711 B2
(45) Date of Patent: Sep. 22, 2015

(54) SYSTEMS AND METHODS FOR ARRAY CAMERA FOCAL PLANE CONTROL

(71) Applicant: Pelican Imaging Corporation, Santa Clara, CA (US)

(72) Inventor: Andrew Kenneth John McMahon, San Carlos, CA (US)

(73) Assignee: Pelican Imaging Corporation, Santa Clara, CA (US)

( * ) Notice: Subject to any disclaimer, the term of this patent is extended or adjusted under 35 U.S.C. 154(b) by 85 days.

(21) Appl. No.: 14/079,510

(22) Filed: Nov. 13, 2013

(65) Prior Publication Data

US 2014/0132810 A1    May 15, 2014

Related U.S. Application Data

(60) Provisional application No. 61/725,934, filed on Nov. 13, 2012, provisional application No. 61/772,315, filed on Mar. 4, 2013.

(51) Int. Cl.
*H04N 5/225* (2006.01)
*H04N 5/374* (2011.01)
(Continued)

(52) U.S. Cl.
CPC ........... *H04N 5/3742* (2013.01); *H04N 3/1593* (2013.01); *H04N 5/3415* (2013.01); *H04N 9/09* (2013.01); *G06T 2207/10052* (2013.01); *H04N 2209/049* (2013.01)

(58) Field of Classification Search
CPC ................ H04N 5/374; H04N 5/3742; H04N 2209/024; H04N 2209/049; H04N 3/1593; H04N 3/4038; H04N 13/0282; H04N 9/09; G06T 2200/21; G06T 2207/10052; G06K 9/209

USPC ............................... 348/218.1, 262, 335, 340
See application file for complete search history.

(56) References Cited

U.S. PATENT DOCUMENTS

| 4,124,798 A | 11/1978 | Thompson |
| 4,198,646 A | 4/1980 | Alexander et al. |

(Continued)

FOREIGN PATENT DOCUMENTS

| EP | 840502 A2 | 5/1998 |
| EP | 1734766 A2 | 12/2006 |

(Continued)

OTHER PUBLICATIONS

Horisaki et al., "Irregular Lens Arrangement Design to Improve Imaging Performance of Compound-Eye Imaging Systems", Applied Physics Express, 2010, vol. 3, pp. 022501-1-022501-3.

(Continued)

*Primary Examiner* — Sinh Tran
*Assistant Examiner* — Mark Monk
(74) *Attorney, Agent, or Firm* — KPPB LLP

(57) ABSTRACT

Systems and methods for controlling the parameters of groups of focal planes as focal plane groups in an array camera are described. One embodiment includes a plurality of focal planes, and control circuitry configured to control the capture of image data by the pixels within the focal planes. In addition, the control circuitry includes: a plurality of parameter registers, where a given parameter register is associated with one of the focal planes and contains configuration data for the associated focal plane; and a focal plane group register that contains data identifying focal planes that belong to a focal plane group. Furthermore, the control circuitry is configured to control the imaging parameters of the focal planes in the focal plane groups by mapping instructions that address virtual register addresses to the addresses of the parameter registers associated with focal planes within specific focal plane groups.

20 Claims, 4 Drawing Sheets

(51) Int. Cl.
  *H04N 9/09* (2006.01)
  *H04N 3/14* (2006.01)
  *H04N 5/341* (2011.01)

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 5,005,083 A | 4/1991 | Grage |
| 5,070,414 A | 12/1991 | Tsutsumi |
| 5,144,448 A | 9/1992 | Hornbaker |
| 5,327,125 A | 7/1994 | Iwase et al. |
| 5,629,524 A | 5/1997 | Stettner et al. |
| 5,808,350 A | 9/1998 | Jack et al. |
| 5,832,312 A | 11/1998 | Rieger et al. |
| 5,880,691 A | 3/1999 | Fossum et al. |
| 5,933,190 A | 8/1999 | Dierickx et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,358,862 B1 | 3/2002 | Ireland et al. |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,657,218 B2 | 12/2003 | Noda |
| 6,671,399 B1 | 12/2003 | Berestov |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,795,253 B2 | 9/2004 | Shinohara |
| 6,819,358 B1 | 11/2004 | Kagle et al. |
| 6,879,735 B1 | 4/2005 | Portniaguine et al. |
| 6,903,770 B1 | 6/2005 | Kobayashi et al. |
| 6,909,121 B2 | 6/2005 | Nishikawa |
| 6,927,922 B2 | 8/2005 | George et al. |
| 6,958,862 B1 | 10/2005 | Joseph |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,262,799 B2 | 8/2007 | Suda |
| 7,292,735 B2 | 11/2007 | Blake et al. |
| 7,295,697 B1 | 11/2007 | Satoh |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,606,484 B1 | 10/2009 | Richards et al. |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,782,364 B2 | 8/2010 | Smith |
| 7,840,067 B2 | 11/2010 | Shen et al. |
| 7,912,673 B2 | 3/2011 | Hébert et al. |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,164,629 B1 | 4/2012 | Zhang |
| 8,180,145 B2 | 5/2012 | Wu et al. |
| 8,189,065 B2 | 5/2012 | Georgiev et al. |
| 8,189,089 B1 | 5/2012 | Georgiev |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,406,562 B2 | 3/2013 | Bassi et al. |
| 8,446,492 B2 | 5/2013 | Nakano et al. |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,559,756 B2 | 10/2013 | Georgiev et al. |
| 8,619,082 B1 | 12/2013 | Ciurea et al. |
| 8,655,052 B2 | 2/2014 | Spooner et al. |
| 8,682,107 B2 | 3/2014 | Yoon et al. |
| 8,773,536 B1 | 7/2014 | Zhang |
| 8,830,375 B2 | 9/2014 | Ludwig |
| 8,842,201 B2 | 9/2014 | Tajiri |
| 8,854,462 B2 | 10/2014 | Herbin et al. |
| 8,896,594 B2 | 11/2014 | Xiong et al. |
| 9,025,894 B2 | 5/2015 | Venkataraman et al. |
| 9,025,895 B2 | 5/2015 | Venkataraman et al. |
| 9,031,335 B2 | 5/2015 | Venkataraman et al. |
| 9,031,342 B2 | 5/2015 | Venkataraman et al. |
| 9,031,343 B2 | 5/2015 | Venkataraman et al. |
| 2001/0005225 A1 | 6/2001 | Clark et al. |
| 2001/0019621 A1 | 9/2001 | Hanna et al. |
| 2001/0038387 A1 | 11/2001 | Tomooka et al. |
| 2002/0012056 A1 | 1/2002 | Trevino |
| 2002/0027608 A1 | 3/2002 | Johnson |
| 2002/0039438 A1 | 4/2002 | Mori et al. |
| 2002/0063807 A1 | 5/2002 | Margulis |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2003/0086079 A1 | 5/2003 | Barth et al. |
| 2003/0124763 A1 | 7/2003 | Fan et al. |
| 2003/0140347 A1 | 7/2003 | Varsa |

(56) References Cited

U.S. PATENT DOCUMENTS

| | | |
|---|---|---|
| 2003/0179418 A1 | 9/2003 | Wengender et al. |
| 2003/0190072 A1 | 10/2003 | Adkins et al. |
| 2003/0211405 A1 | 11/2003 | Venkataraman |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0066454 A1 | 4/2004 | Otani et al. |
| 2004/0096119 A1 | 5/2004 | Williams |
| 2004/0100570 A1 | 5/2004 | Shizukuishi |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0132098 A1 | 6/2005 | Sonoda et al. |
| 2005/0134698 A1 | 6/2005 | Schroeder et al. |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0225654 A1 | 10/2005 | Feldman et al. |
| 2005/0275946 A1 | 12/2005 | Choo et al. |
| 2005/0286612 A1 | 12/2005 | Takanashi |
| 2006/0002635 A1 | 1/2006 | Nestares et al. |
| 2006/0023197 A1 | 2/2006 | Joel |
| 2006/0023314 A1 | 2/2006 | Boettiger et al. |
| 2006/0033005 A1 | 2/2006 | Jerdev et al. |
| 2006/0034003 A1 | 2/2006 | Zalevsky |
| 2006/0038891 A1 | 2/2006 | Okutomi et al. |
| 2006/0039611 A1 | 2/2006 | Rother |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203113 A1 | 9/2006 | Wada et al. |
| 2006/0210186 A1 | 9/2006 | Berkner |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0008575 A1 | 1/2007 | Yu et al. |
| 2007/0024614 A1 | 2/2007 | Tam |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen et al. |
| 2007/0296847 A1 | 12/2007 | Chang et al. |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0112635 A1 | 5/2008 | Kondo et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0298674 A1 | 12/2008 | Baker et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0128833 A1 | 5/2009 | Yahav |
| 2009/0152664 A1 | 6/2009 | Klem et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |

(56) References Cited

U.S. PATENT DOCUMENTS

| | | |
|---|---|---|
| 2009/0207235 A1 | 8/2009 | Francini et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0177411 A1 | 7/2010 | Hegde et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0223237 A1 | 9/2010 | Mishra et al. |
| 2010/0231285 A1 | 9/2010 | Boomer et al. |
| 2010/0244165 A1 | 9/2010 | Lake et al. |
| 2010/0265385 A1 | 10/2010 | Knight et al. |
| 2010/0281070 A1 | 11/2010 | Chan et al. |
| 2010/0302423 A1 | 12/2010 | Adams, Jr. et al. |
| 2010/0309292 A1 | 12/2010 | Ho et al. |
| 2011/0001037 A1 | 1/2011 | Tewinkle |
| 2011/0018973 A1 | 1/2011 | Takayama |
| 2011/0019243 A1 | 1/2011 | Constant, Jr. et al. |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0069189 A1* | 3/2011 | Venkataraman et al. .. 348/218.1 |
| 2011/0080487 A1 | 4/2011 | Venkataraman et al. |
| 2011/0108708 A1 | 5/2011 | Olsen et al. |
| 2011/0121421 A1 | 5/2011 | Charbon et al. |
| 2011/0122308 A1 | 5/2011 | Duparre |
| 2011/0128412 A1 | 6/2011 | Milnes et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0255592 A1 | 10/2011 | Sung et al. |
| 2011/0255745 A1 | 10/2011 | Hodder et al. |
| 2011/0261993 A1 | 10/2011 | Weiming et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279721 A1* | 11/2011 | McMahon ............... 348/302 |
| 2011/0285866 A1 | 11/2011 | Bhrugumalla et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0317766 A1 | 12/2011 | Lim, II et al. |
| 2012/0012748 A1* | 1/2012 | Pain et al. ............... 250/332 |
| 2012/0023456 A1 | 1/2012 | Sun et al. |
| 2012/0026297 A1 | 2/2012 | Sato |
| 2012/0026342 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0069235 A1 | 3/2012 | Imai |
| 2012/0105691 A1 | 5/2012 | Waqas et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0170134 A1 | 7/2012 | Bolis et al. |
| 2012/0176479 A1 | 7/2012 | Mayhew et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200734 A1 | 8/2012 | Tang |
| 2012/0219236 A1 | 8/2012 | Ali et al. |
| 2012/0229628 A1 | 9/2012 | Ishiyama et al. |
| 2012/0249550 A1 | 10/2012 | Akeley et al. |
| 2012/0262607 A1 | 10/2012 | Shimura et al. |
| 2012/0268574 A1 | 10/2012 | Gidon |
| 2012/0287291 A1 | 11/2012 | McMahon |
| 2012/0293695 A1 | 11/2012 | Tanaka |
| 2012/0314033 A1 | 12/2012 | Lee et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee |
| 2013/0077880 A1 | 3/2013 | Venkataraman et al. |
| 2013/0077882 A1 | 3/2013 | Venkataraman et al. |
| 2013/0088637 A1 | 4/2013 | Duparre |
| 2013/0113899 A1 | 5/2013 | Morohoshi et al. |
| 2013/0120605 A1 | 5/2013 | Georgiev et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0215108 A1 | 8/2013 | McMahon et al. |
| 2013/0222556 A1 | 8/2013 | Shimada |
| 2013/0229540 A1 | 9/2013 | Farina et al. |
| 2013/0230237 A1 | 9/2013 | Schlosser et al. |
| 2013/0259317 A1 | 10/2013 | Gaddy |
| 2013/0265459 A1 | 10/2013 | Duparre et al. |
| 2013/0274923 A1 | 10/2013 | By et al. |
| 2013/0293760 A1 | 11/2013 | Nisenzon et al. |
| 2014/0009586 A1 | 1/2014 | McNamer et al. |
| 2014/0076336 A1 | 3/2014 | Clayton et al. |
| 2014/0092281 A1 | 4/2014 | Nisenzon et al. |
| 2014/0104490 A1 | 4/2014 | Hsieh et al. |
| 2014/0118493 A1 | 5/2014 | Sali et al. |
| 2014/0176592 A1 | 6/2014 | Wilburn et al. |

(56) References Cited

U.S. PATENT DOCUMENTS

| | | |
|---|---|---|
| 2014/0192253 A1 | 7/2014 | Laroia |
| 2014/0198188 A1 | 7/2014 | Izawa |
| 2014/0253738 A1 | 9/2014 | Mullis |
| 2014/0267762 A1 | 9/2014 | Mullis et al. |
| 2014/0285675 A1 | 9/2014 | Mullis |
| 2015/0091900 A1 | 4/2015 | Yang et al. |

FOREIGN PATENT DOCUMENTS

| | | | |
|---|---|---|---|
| EP | 2336816 A2 | 6/2011 | |
| JP | 2006033493 A | 2/2006 | |
| JP | 2007520107 A | 7/2007 | |
| JP | 2011109484 A | 6/2011 | |
| JP | 2013526801 A | 6/2013 | |
| JP | 2014521117 A | 8/2014 | |
| KR | 1020110097647 A | 8/2011 | |
| TW | 200939739 A | 9/2009 | |
| WO | 2007083579 A1 | 7/2007 | |
| WO | 2009151903 A2 | 12/2009 | |
| WO | 2011116203 A1 | 9/2011 | |
| WO | 2011143501 A1 | 11/2011 | |
| WO | 2012057619 A1 | 5/2012 | |
| WO | 2012057620 A2 | 5/2012 | |
| WO | 2012057621 A1 | 5/2012 | |
| WO | 2012057622 A1 | 5/2012 | |
| WO | 2012057623 A1 | 5/2012 | |
| WO | 2012057620 A3 | 6/2012 | |
| WO | 2012074361 A1 | 6/2012 | |
| WO | 2012078126 A1 | 6/2012 | |
| WO | 2012082904 A1 | 6/2012 | |
| WO | 2012155119 A1 | 11/2012 | |
| WO | 2013003276 A1 | 1/2013 | |
| WO | 2013043751 A1 | 3/2013 | |
| WO | 2013043761 A1 | 3/2013 | |
| WO | 2013049699 A1 | 4/2013 | |
| WO | 2013055960 A1 | 4/2013 | |
| WO | 2013119706 A1 | 8/2013 | |
| WO | 2013126578 A1 | 8/2013 | |
| WO | 2014052974 A2 | 4/2014 | |
| WO | 2014032020 A3 | 5/2014 | |
| WO | 2014149403 A1 | 9/2014 | |
| WO | 2014164550 A2 | 10/2014 | |
| WO | 2014133974 A9 | 4/2015 | |
| WO | 2015048694 A1 | 4/2015 | |

OTHER PUBLICATIONS

Horisaki et al., "Superposition Imaging for Three-Dimensionally Space-Invariant Point Spread Functions", Applied Physics Express, 2011, vol. 4, pp. 112501-1-112501-3.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs.
Lensvector, "How LensVector Autofocus Works", http://www.lensvector.com/overview.html.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Muehlebach, "Camera Auto Exposure Control for VSLAM Applications", Studies on Mechatronics.
Nayar, "Computational Cameras: Redefining the Image", IEEE Computer Society, Aug. 2006, pp. 30-38.
NG, "Digital Light Field Photography", Thesis, Jul. 2006, 203 pgs.
NG et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.

(56) References Cited

OTHER PUBLICATIONS

Veilleux, "CCD Gain Lab: The Theory", University of Marland, College Park-Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, Oct. 19, 2006, 1-5.
Vuong et al., "A New Auto Exposure and Auto White-Balance Algorithm to Detect High Dynamic Range Conditions Using CMOS Technology".
Wang, "Calculation Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)".
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "Superresolution Using Preconditioned Conjugate Gradient Method", Source and date unknown, 8 pgs.
Zomet et al., "Robust Super-Resolution", IEEE, 2001, pp. 1-6.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Joshi, et al., "Synthetic Aperture Tracking: Tracking Through Occlusions", ICCV IEEE 11th International Conference on Computer Vision, Oct. 2007 Retrieved from http:l/ieeexplore.ieee.org/stamp/stamp.jsp?tp=&arnumber=4409032&isnumber=4408819 on Jul. 28, 2014, pp. 1-8.
Lai et al., "A Large-Scale Hierarchical Multi-View RGB-D Object Dataset", source and date unknown, 8 pgs.
Perwass et al., "Single Lens 3D-Camera with Extended Depth-of-Field", printed from www.raytrix.de, 15 pgs.
Tallon et al., "Upsampling and Denoising of Depth Maps Via Joint-Segmentation", 20th European Signal Processing Conference, Aug. 27-31, 2012, 5 pgs.
Zhang, Qiang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
International Search Report and Written Opinion for International Application No. PCT/US13/46002, Search Completed Nov. 13, 2013, Mailed Nov. 29, 2013, 7 pgs.
International Search Report and Written Opinion for International Application No. PCT/US13/48772, Search Completed Oct. 21, 2013, Mailed Nov. 8, 2013, 6 pgs.
International Search Report and Written Opinion for International Application No. PCT/US13/56065, Search Completed Nov. 25, 2013, Mailed Nov. 26, 2013, 8 pgs.
International Search Report and Written Opinion for International Application No. PCT/US13/59991, Search Completed Feb. 6, 2014, Mailed Feb. 26, 2014, 8 pgs.
International Search Report and Written Opinion for International Application No. PCT/US2013/024987, Search Completed Mar. 27, 2013, Mailed Apr. 15, 2013, 14 pgs.
International Search Report and Written Opinion for International Application No. PCT/US2013/056502, Search Completed Feb. 18, 2014, Mailed Mar. 19, 2014, 7 pgs.
International Search Report and Written Opinion for International Application No. PCT/US2013/069932, International Filing Date Nov. 13, 2013, Search Completed Mar. 14, 2014, Mailed Apr. 14, 2014, 12 pgs.
IPRP for International Application No. PCT/US2012/059813, International Filing Date Oct. 11, 2012, Search Completed Apr. 15, 2014, 7 pgs.
Search Report and Written Opinion for International Application PCT/US11/36349, mailed Aug. 22, 2011, 12 pgs.
International Search Report and Written Opinion for International Application No. PCT/US2011/64921, Report Completed Feb. 25, 2011, mailed Mar. 6, 2012, 17 pgs.
International Search Report and Written Opinion for International Application No. PCT/US2013/027146, completed Apr. 2, 2013, 12 pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US12/37670, Mailed Jul. 18, 2012, Search Completed Jul. 5, 2012, 9 pgs.
International Search Report and Written Opinion for International Application PCT/US2012/58093, completed Nov. 15, 2012, 12 pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "Light Field Superresolution", Retrieved from http://home.eps.hw.ac.uk/~sz73/ICCP09/LightFieldSuperresolution.pdf, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.

(56) References Cited

OTHER PUBLICATIONS

Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs.
Boye et al., "Comparison of Subpixel Image Registration Algorithms", Proc. of SPIE-IS&T Electronic Imaging, vol. 7246, pp. 72460X-1-72460X-9.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012. Retrieved from the Internet at URL:<http://citeseerx.ist.psu.edu/viewdoc/download?doi=10.1.1.226.2643&rep=rep1&type=pdf>, Title pg., abstract, table of contents, pp. 1-263 (269 total pages).
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 3005, vol. 44, No. 15, pp. 2949-2956.
Duparre et al., "Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012. Retrieved from the Internet at URL:<http://www.site.uottawa.ca/-edubois/theses/Fanaswala_thesis.pdf>, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., Optical System Design, 2nd Edition, SPIE Press, pp. 191-198.
Fischer et al., Optical System Design, 2nd Edition, SPIE Press, pp. 49-58.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
International Preliminary Report on Patentability for International Application PCT/US13/62720, Report Issued Mar. 31, 2015, Mailed Apr. 9, 2015, 8 Pgs.
International Preliminary Report on Patentability for International Application No. PCT/US2013/069932, Report issued May 19, 2015, Mailed May 28, 2015, 12 Pgs.
International Search Report and Written Opinion for International Application No. PCT/US2015/019529, Search completed May 5, 2015, Mailed Jun. 8, 2015, 10 Pgs.
Moreno-Noguer, Francesc et al., "Active Refocusing of Images and Videos", ACM SIGGRAPH, 2007, vol. 26, pp. 1-10, retrieved on Jul. 8, 2015, Retrieved from http://doi.acm.org/10.1145/1276377.1276461.
Yang et al., "A Real-Time Distributed Light Field Camera", Eurographics Workshop on Rendering (2002), pp. 1-10.

* cited by examiner

SYSTEMS AND METHODS FOR ARRAY CAMERA FOCAL PLANE CONTROL

CROSS-REFERENCE TO RELATED APPLICATIONS

The present application claims priority to U.S. Provisional Patent Application Ser. No. 61/725,934 entitled "Systems and Methods for Array Camera Focal Plane Control" to Andrew McMahon, filed Nov. 13, 2012 and U.S. Provisional Patent Application Ser. No. 61/772,315 entitled "Systems and Methods for Array Camera Focal Plane Control" to Andrew McMahon, filed Mar. 4, 2013. The disclosures of U.S. Provisional Patent Application Ser. Nos. 61/725,934 and 61/772,315 are hereby incorporated by reference in their entirety.

FIELD OF THE INVENTION

The present invention is generally related to array cameras and more specifically to parameter control of array camera focal plane groups by an external device such as a processor.

BACKGROUND

Imaging devices, such as cameras, can be used to capture images of portions of the electromagnetic spectrum, such as the visible light spectrum, incident upon an image sensor. For ease of discussion, the term light is generically used to cover radiation across the entire electromagnetic spectrum. In a typical imaging device, light enters through an opening (aperture) at one end of the imaging device and is directed to an image sensor by one or more optical elements such as lenses. The image sensor includes pixels or sensor elements that generate signals upon receiving light via the optical element. Commonly used image sensors include charge-coupled device (CCDs) sensors and complementary metal-oxide semiconductor (CMOS) sensors.

Generally, image capture utilizes a single image sensor, to capture individual images, one at a time. A digital camera typically combines both an image sensor and processing capabilities. When the digital camera takes a photograph, the data captured by the image sensor is provided to the processor by the image sensor. Processors are able to control aspects of a captured image by changing image capture parameters of the sensor elements or groups of sensor elements used to capture the image. Integration time, which is the length of time that a sensor element measures incident light, is one parameter that can be adjusted to increase or decrease light exposure for an image sensor. Another parameter that the processor can control is pixel gain, which is the adjustment of the scaling applied to the signal generated by the sensor element.

SUMMARY OF THE INVENTION

Systems and methods in accordance with embodiments of the invention for controlling the parameters of groups of focal planes as focal plane groups in an array camera. One embodiment of the invention includes a plurality of focal planes, where each focal plane includes a plurality of rows of pixels that also form a plurality of columns of pixels and each focal plane is contained within a region that does not contain pixels from another focal plane, and control circuitry configured to control the capture of image data by the pixels within the focal planes, where the control circuitry is configured so that the capture of image data by the pixels in at least two of the focal planes is separately controllable. In addition, the control circuitry includes a plurality of registers with associated register addresses, where the plurality of registers includes: a plurality of parameter registers, where a given parameter register is associated with one of the plurality of focal planes and contains configuration data for the associated focal plane; and a focal plane group register that contains data identifying focal planes from the plurality of focal planes that belong to a focal plane group. Furthermore, the control circuitry is further configured to: receive commands to write data to and read data from register addresses via an interface; map a virtual register address to the addresses of the parameter registers associated with the focal planes that belong to the focal plane group; modify the parameter registers associated with the focal planes in the focal plane group in response to receiving a command to write a value to the virtual register address via the interface; and control imaging parameters of the plurality of focal planes based upon the configuration data in the parameter register associated with each of the plurality of focal planes.

In a further embodiment, the control circuitry is further configured to modify the data in the focal plane group register to change the focal planes from the plurality of focal planes that are identified as forming a focal plane group in response to receiving a command to write a value to the register address of the focal plane group register via the interface.

In another embodiment, the focal plane group register contains a list of the focal planes in the focal plane group.

In a still further embodiment, the focal plane group register is one of a plurality of focal plane group registers and each focal plane group register contains data identifying focal planes from the plurality of focal planes that belong to a specific focal plane group.

In still another embodiment, the plurality of focal plane group registers is configured so that a given focal plane belongs to a plurality of different focal plane groups.

In a yet further embodiment, the control circuitry is configured to prevent the plurality of focal plane group registers from being configured so that a given focal plane belongs to a predetermined set of focal plane groups.

In yet another embodiment, the configuration data in a given parameter register controls integration time of pixels in the focal plane associated with the given parameter register.

In a further embodiment again, the configuration data in a given parameter register controls a gain applied to pixel outputs of pixels in the focal plane associated with the given parameter register.

In another embodiment again, the configuration data in a given parameter register controls focal plane operational state of the focal plane associated with the given parameter register.

A further additional embodiment further includes at least one system descriptor register, where the at least one system descriptor register contains system descriptor data describing the imaging sensor. In addition, the control circuitry is configured to receive instructions to read data from the at least one system descriptor register via the interface.

In another additional embodiment, the system descriptor data includes at least one piece of data selected from a group consisting of information identifying: a type of imaging sensor; a version of the imaging sensor, a communication protocol supported by the imaging sensor; an imaging sensor hardware manufacturer; a hardware manufacturer's model and version; the number of the plurality focal planes; a layout for the plurality of focal planes; an initial imaging sensor configuration; default focal plane groups for the plurality of focal planes; default integration times for default focal plane groups; and default gains for default focal plane groups.

A still yet further embodiment also includes at least one color filter applied to the pixels on at least one focal plane.

In still yet another embodiment, the at least one color filter applied to the pixels on at least one focal plane forms a Bayer pattern on at least one focal plane.

In a still further embodiment again, the at least one color filter applied to the pixels on at least one focal plane are applied so that the pixels of at least one of the plurality of focal planes are configured to capture image data from the same discrete portion of the electromagnetic spectrum.

In still another embodiment again, the focal plane group register is one of a plurality of focal plane group registers and each focal plane group register contains data identifying focal planes from the plurality of focal planes that belong to a specific focal plane group. In addition, the control circuitry is further configured to modify the data in a given focal plane group register to change the focal planes that are identified as forming a focal plane group in response to receiving a command to write a value to the register address of the given focal plane group register via the interface. Furthermore, the configuration data in a given parameter register controls: a focal plane operational state of the focal plane associated with the given parameter register; integration time of pixels in the focal plane associated with the given parameter register; and a gain applied to pixel outputs of pixels in the focal plane associated with the given parameter register.

An embodiment of the method of the invention includes: receiving a command to write data to a virtual register address via an interface; mapping the virtual register address to at least one physical address based upon data identifying focal planes from the plurality of focal planes that belong to a focal plane group stored in a focal plane group register associated with the virtual address using control circuitry; modifying configuration data stored in parameter registers associated with the focal plane groups in response to the instruction to write data to a virtual register address using the control circuitry; and controlling imaging parameters of pixels within the plurality of focal planes based upon configuration data stored in the parameter registers associated with each of the plurality of focal planes using the control circuitry.

A further embodiment of the method of the invention also includes receiving a command to write a value to a register address associated with the focal plane group register via the interface, and modifying the data in the focal plane group register to change the focal planes from the plurality of focal planes that are identified as forming a focal plane group in response to the command using the control circuitry.

Another embodiment of the method of the invention includes: assigning multiple focal planes from the plurality of focal planes to a focal plane group by outputting a command to an imaging sensor interface to write a value to a register address associated with a focal plane group register on the imaging sensor using a processor configured by array camera software; controlling imaging parameters for the multiple focal planes assigned to the focal plane group by outputting a command to the imaging sensor interface to write a value to a virtual address using the processor configured by the array camera software; and receiving imaging data from the imaging sensor via the imaging sensor interface, where the imaging data includes imaging data captured by the multiple focal planes assigned to the focal plane group using imaging parameters determined based upon the command to write a value to the virtual address.

A still further embodiment of the method of the invention also includes: receiving at least one system descriptor from the imaging sensor via the imaging sensor interface using the processor configured by the array camera application; and determining the number of focal planes in the plurality of focal planes based upon the at least one system descriptor using the processor configured by the array camera application.

Still another embodiment of the method of the invention also includes determining the layout of the plurality of focal planes based upon the at least one system descriptor using the processor configured by the array camera application.

DETAILED DESCRIPTION

Figure 1:
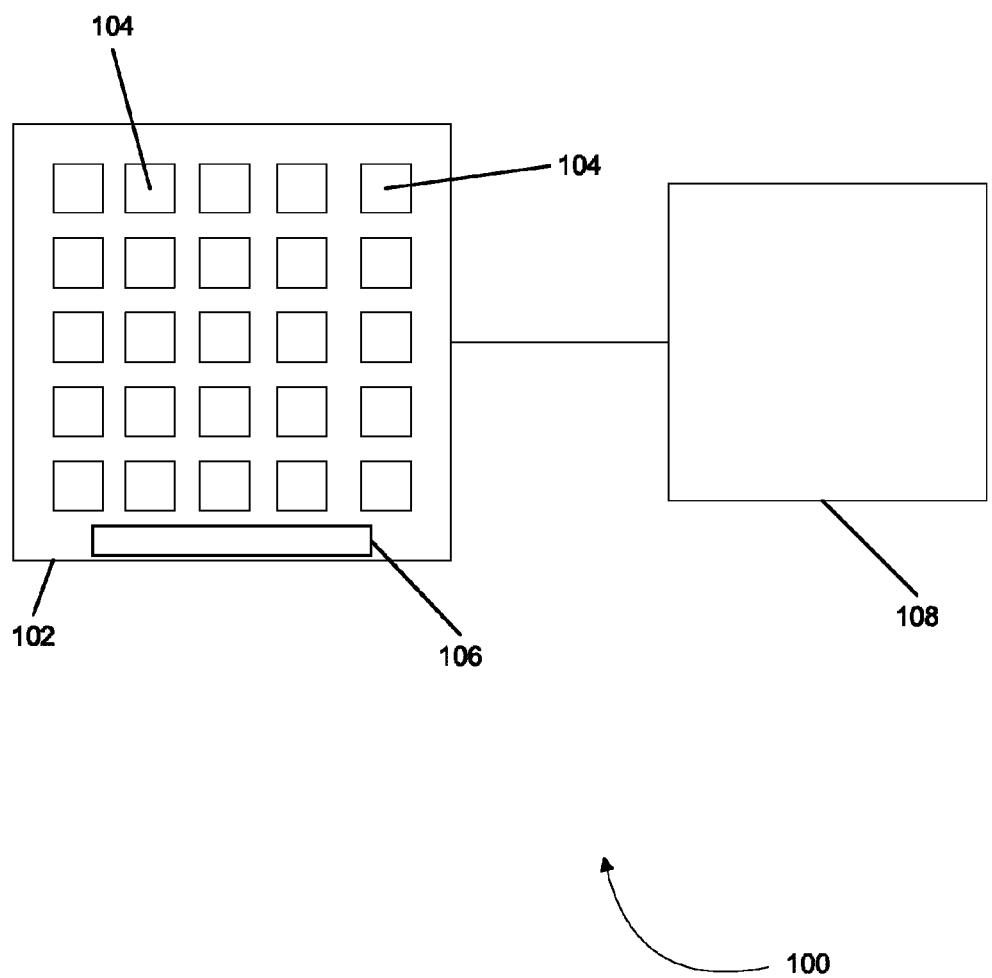
FIG. 1 illustrates an array camera constructed using a sensor including a 5×5 array of focal planes and storage hardware, where the sensor is connected to a processor in accordance with an embodiment of the invention.

Turning now to the drawings, systems and methods for controlling the parameters of groups of focal planes as focal plane groups in an array camera in accordance with embodiments of the invention are illustrated. An array camera is an image capture device that includes multiple lens stacks or optical channels that direct light onto a corresponding number of focal planes, enabling the capture of multiple images of a scene using the focal planes. The term focal plane can be used to describe a region on a sensor containing an array of pixel elements configured to capture an image based upon light directed onto the focal plane via a lens stack or optical channel. A sensor can include multiple focal planes, where each focal plane receives light from a separate optical channel. As such, the sensor is configured to separately and (in many instances) independently capture and output image data from each of the focal planes. Color filters can be located within the optical stack or applied to the pixels on a focal plane (e.g. using a conventional Bayer pattern) so that individual focal planes and/or individual pixels capture images of discrete portions of the electromagnetic spectrum. Various examples of array cameras are described in U.S. patent application Ser. No. 12/935,504, entitled "Capturing and Processing of Images Using Monolithic Camera Array with Heterogeneous Imagers", to Venkataraman et al., which is incorporated by reference herein in its entirety. In many embodiments, faster and more efficient control of image capture is accomplished by managing multiple focal planes on a sensor in groups rather than individually. Controlling the focal planes in focal plane groups rather than individually reduces the number and frequency with which commands are exchanged between a processor and a sensor containing multiple focal planes. The reduction of commands exchanged between the processor and the sensor when controlling the capture of images by the focal planes allows the configuration of the focal planes of an array camera to be modified more rapidly. In many embodiments, the focal planes of an array camera can be reconfigured in less than the time it takes for one of the focal planes to capture a single image or frame. In many embodiments, a processor can issue write instructions to a virtual address associated with a focal plane group and logic within the sensor maps the virtual address to a set of physical addresses and writes the data to the physical addresses.

In many embodiments, the sensor is configured so that a processor can control the parameters, or imaging characteristics, of focal planes using focal plane groups. In addition, the processor can also dynamically configure the focal planes that are included in each focal plane group. In several embodiments, the focal plane group parameters that can be controlled include integration time and gain. Other parameters can include (but are not limited to) the operational state of a focal plane, such as whether the focal plane is active, in a reduced power state or on standby. Still other parameters include image quality of a captured image from a focal plane or whether an image captured by a focal plane is output to a processor. Yet other parameters include test patterns that focal planes can take for troubleshooting or other purposes. Despite the limited number of parameters mentioned above, numerous other parameters can be utilized to control focal planes for image capture or to create additional photographic effects in accordance with numerous embodiments of the invention.

In many embodiments of the invention, sensors include memory in which at least one system descriptor is stored. In several embodiments, processors can be robustly coupled with any sensor that includes a system descriptor of the sensor. The processor retrieves the system descriptor and utilizes the system descriptor to interpret the output of the imaging sensor. These system descriptors can be stored in memory incorporated into the circuitry of the sensor. In this way, the array camera software can configure the processor to coordinate communication with the imaging sensor based upon the type of sensor detected. System descriptors can include any type of information relating to a sensor including (but not limited to) information identifying the sensor, the version of the sensor, the communication protocol to be used between the sensor and processor, the sensor hardware manufacturer, the hardware manufacturer's model and version, the number of focal planes and the layout of the focal plane. Although a number of system descriptors are detailed above, many other system descriptors that describe aspects of an array camera can be utilized as appropriate to the requirements of a specific application in accordance with many embodiments of the invention. Array cameras, sensors, and the control of image capture by array cameras in accordance with embodiments of the invention are discussed below.

System Architecture

Array cameras in accordance with embodiments of the invention are configured so that the array camera software can vary the manner in which a sensor captures image data. In many embodiments, the array camera uses registers on the sensor to provide information to the software concerning the configuration of the sensor and to enable the processor to control the manner in which the sensor elements of the sensor capture image data. An array camera including a sensor having registers that are accessible via a processor is illustrated in FIG. 1. The array camera 100 includes a sensor 102 configured to communicate with a processor 108. The processor receives image data generated by the sensor and, as is discussed further below, the processor can read and write to registers located on the sensor. In many embodiments, the processor can read and write to registers by issuing read and/or write commands that include register addresses.

The sensor 102 includes multiple focal planes 104. Sensors including multiple focal planes are discussed in U.S. patent application Ser. No. 13/106,797 entitled "Architectures for System on Chip Array Cameras", to Pain et al., the disclosure of which is incorporated by reference. In the illustrated embodiment, the focal planes are configured in a 5×5 array. In other embodiments, any of a variety of array configurations can be utilized including linear arrays. Each focal plane 104 of the sensor is capable of capturing an image of the scene. The sensor elements utilized in the focal planes can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light incident on the structure. In many embodiments, the sensor elements of each focal plane have similar physical properties and receive light via the same optical channel and color filter (where present). In other embodiments, the sensor elements have different characteristics and, in many instances, the characteristics of the sensor elements are related to the color filter applied to each sensor element.

In the illustrated embodiment, the sensor 102 also includes multiple registers 106. In many embodiments, the sensor registers can contain information concerning the configuration of the sensor. In several embodiments, the processor 108 can write values to one or more registers on the sensor to control the manner in which the sensor elements of the sensor capture image data.

In many embodiments, the processor is able to read system descriptors in the register of a sensor to determine information that the processor can use to control the capture of image data by the sensor elements in each of the focal planes of the sensor. System descriptors can include information such as the number and orientation of focal planes, allowing for the processor to simply read a description of the sensor rather than requiring it to otherwise detect the number and orientation of focal planes, or other information essential for the processor to control the focal planes in the sensor. Additionally, the system descriptors can include information such as the initial configuration of the sensor, such as preprogramed or default focal plane groups of the focal planes as well as the gain or integration time associated with particular focal planes. In various embodiments, a processor can utilize information from the system descriptors to assign focal planes in a sensor into specific focal plane groups for enhanced control of the sensor's output to optimize the image captured by an array camera. These assigned focal plane groups free the processor from controlling each focal plane individually.

In numerous embodiments, control of focal plane groups is accomplished by adjusting parameters associated with the focal planes of the focal plane group. These parameters can be related to the way that a focal plane interacts with light, such as integration time. These parameters can also include preprocessing considerations for data output from the sensor to the processor, such as the gain of the sensor element output. In other embodiments, any of a variety of parameters appropriate to a specific application can be controlled via registers on a sensor in accordance with embodiments of the invention.

In many embodiments, parameters associated with control of focal plane groups are stored directly in a register, memory or any other means of hardware data storage on the sensor. Thereby, the focal plane groups are directly configured in the hardware of the sensor and a processor can directly control the parameters of focal planes and focal plane groups by adjusting the configuration data stored in the sensor.

Although specific array camera system architectures are discussed above, many other array camera architectures are possible in accordance with various embodiments of the invention. Further discussions of sensor configurations are detailed below.

Sensor Configuration

The focal planes on a sensor can be dynamically configured (i.e. the focal plane groups are programmable) into a plurality of focal plane groups of at least one focal plane in accordance with embodiments of the invention. In a number of embodiments, the focal plane groups are defined using group member lists that identify the focal planes that belong to a specific focal plane group. In several embodiments, logic circuitry on the sensor uses the group member list to associate the register addresses of the focal planes identified by the group member list with a virtual register address or a set of virtual register addresses. When the sensor receives a request to write data to a virtual register address, logic within the sensor causes the data to be written to the appropriate register(s) of the focal planes associated with the virtual address by the group member list. In this way, a focal plane group can be controlled with a single command, which reduces the likelihood that communication of commands would span more than one frame time for all focal planes within the focal plane group and allows for faster and more efficient command and control of individual focal planes by a processor.

Figure 2A:
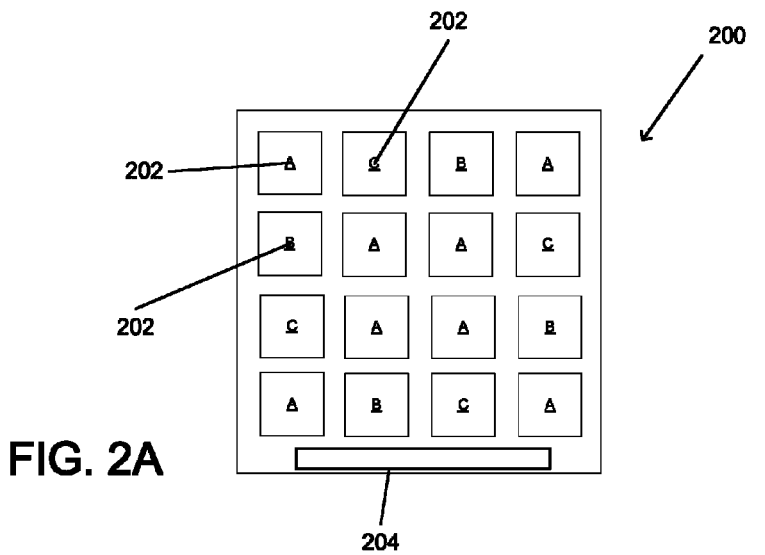
FIG. 2A illustrates a sensor including storage where the sensor includes a 4×4 array of focal planes, where each focal plane includes an array of sensor elements and is grouped into one of three focal plane groups, namely focal plane group "A", focal plane group "B" or focal plane group "C", in accordance with an embodiment of the invention.

A sensor with a 4×4 array of focal planes configured into three focal plane groups that can be independently controlled by a processor in accordance with an embodiment of the invention is illustrated in FIG. 2A. The 4×4 sensor 200 includes 16 focal planes 202 divided into three focal plane groups as designated with symbols "A", "B", and "C". Although specific assignments are shown, the focal plane groups can be dynamically modified. The sensor also includes local storage of data associated with the sensor in at least one register 204 on the sensor. The register(s) 204 are configured to store focal plane parameters. In many embodiments, a group member list is used to associate register addresses with a virtual register address. When the sensor receives a command to write parameters to a virtual register address, logic on the sensor uses the group member list to map the virtual register address to the appropriate registers of the focal planes listed in the group member list. The parameters are then written to each of the physical focal plane registers to which the virtual register address maps. In many embodiments, the parameters written to the focal plane registers include (but are not limited to) the focal planes assigned to each focal plane group, the integration time of the pixels of the focal planes in each focal plane group and the gain applied to the outputs of the pixels in the focal planes of each group as well as system descriptors of the sensor.

Figure 2B:
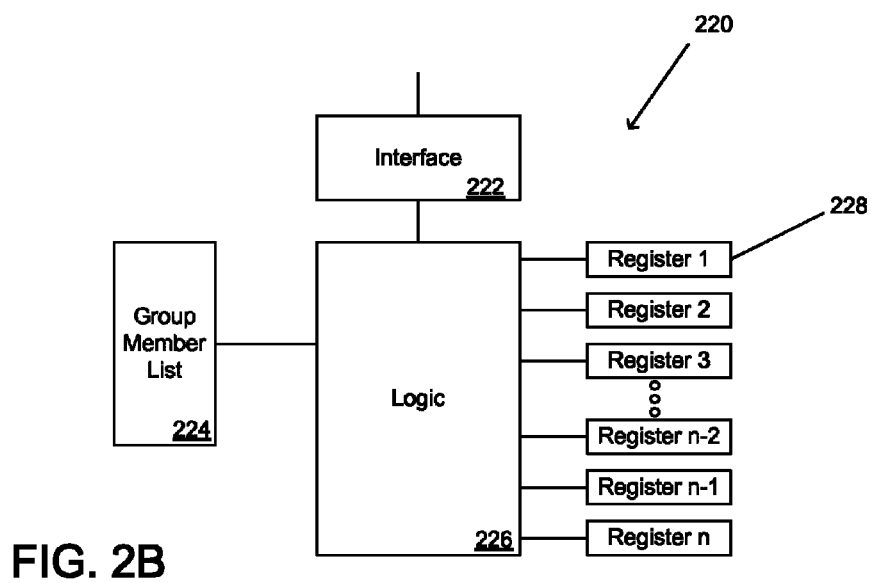
FIG. 2B illustrates digital logic configured to write data addressed to a virtual address to registers associated with the virtual address by a group member list defining focal plane groups in accordance with embodiments of the invention.

Circuitry within a sensor configured to write data to registers associated with focal planes identified in a group member list in accordance with an embodiment of the invention is illustrated in FIG. 2B. In the illustrated embodiment, the sensor circuitry 220 is configured to receive instructions to write data to and read data from register addresses via an interface 222. In several embodiments, the interface can be a two wire interface such as (but not limited to) the 120 interface specified by NXP Semiconductors of Eindhoven, Netherlands. In other embodiments, any of a variety of appropriate interfaces can be utilized in accordance with embodiments of the invention. The sensor is also configured to identify sensor groups using group member lists, which are stored within memory 224 on the sensor. In many embodiments, logic 226 within the sensor enables the processor to define the sensor groups by directly writing or causing group member lists to be written to the memory 224. The logic 226 can use the group member lists to map a virtual address to the physical addresses of registers 228 associated with the focal planes listed in a group member list. When an instruction to write a value to a virtual address is received via the interface 222, the logic 226 determines the registers 228 associated with the virtual address using the group member list associated with the virtual address. Although specific logic circuitry is illustrated in FIG. 2B, any circuitry that can map virtual addresses to one or more physical register addresses can be incorporated into a sensor in accordance with embodiments of the invention.

In comparing embodiments illustrated in FIG. 1 and FIG. 2A, sensors can include any number or arrangement of focal planes such as (but not limited to) the 5×5 arrangement 102 shown in FIG. 1, the 4×4 arrangement 102 shown in FIG. 2A, and any other arrays of focal planes including linear arrays and/or multiple arrays. In addition, the geometric configuration of the sensors is not limited to merely a square or rectangular array but can be arranged in any of a variety of configurations including (but not limited to) circular and/or irregular configurations including configurations in which individual and/or focal plane groups are unevenly spaced from each other in accordance with embodiments of the invention.

In many embodiments, focal planes are formed into focal plane groups based upon the color channel to which the focal plane belongs (i.e. the portion of the electromagnetic spectrum captured by the focal plane). For example, focal planes within a first focal plane group are configured for the detection of red light, while the focal planes in another focal plane group are configured to detect green light and the focal planes in yet another focal plane group are configured to detect blue light, and the imaging parameters for each of the focal plane groups can be set by the processor accordingly. In other embodiments, focal plane groups can be formed from focal planes configured to capture any portion of the electromagnetic spectrum including (but not limited to) infra red light, near-infra red, ultra violet light, and/or extended color light. In other embodiments, the focal plane groups are defined based upon a criteria unrelated to the color channel to which the focal planes belong. Indeed any of a variety of criteria can be utilized in the selection of focal plane groups including (but not limited to) the ability of the sensor to capture images having different dynamic ranges that can be used to synthesize a high dynamic range image.

Although specific processes for configuring sensors using focal plane groups are discussed above, any number of sensor configurations, focal plane groups, and processes for controlling sensor configuration using focal plane groups can be implemented in accordance with embodiments of the invention. The control of the imaging parameters of pixels of a focal plane within a sensor using focal plane groups in accordance with embodiments of the invention is discussed further below.

Focal Plane Group Control

Figure 3:
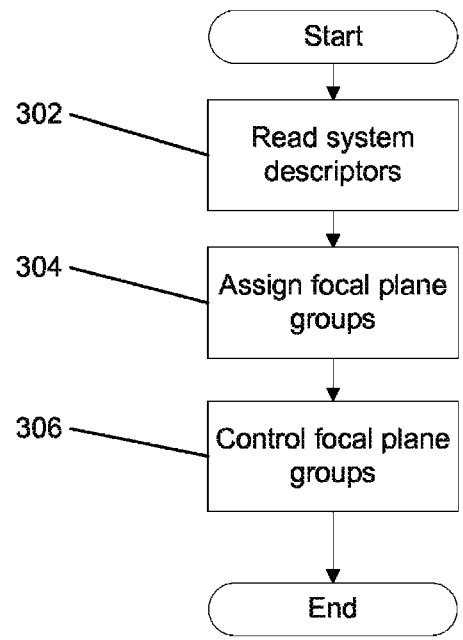
FIG. 3 illustrates a process for assigning and controlling focal plane groups in accordance with an embodiment of the invention.

Sensors in accordance with embodiments of the invention are typically designed for efficient control of focal planes by assigning specific focal planes to focal plane groups for enhanced control of focal plane parameters in accordance with embodiments of the invention. In many embodiments, control of focal plane groups occurs seamlessly through the use of system descriptors that indicate to a processor how to interface with the sensor. A process utilized by a processor to control focal plane groups on a sensor in accordance with an embodiment of the invention is illustrated in FIG. 3. The process includes reading (302) system descriptors from registers on the sensor, assigning (304) focal planes on the sensor to focal plane groups by writing values to registers defining focal plane groups on the sensor and controlling (306) the focal plane groups by writing values to registers defining the imaging parameters of the focal planes within a focal plane group.

In many embodiments, the reading (302) of system descriptors from registers on the sensor allows a processor to identify the particular sensor. In other embodiments, the processor does not read system descriptors as the information is available to the processor via another source (e.g. configuration data stored in memory separate from the sensor).

In several embodiments, assignment (304) of focal plane groups can be performed by a processor or can occur through default settings on the sensor, such as (but not limited to) a preprogramed set of focal plane groups set by the sensor. In various embodiments, the membership of a focal plane group can be dynamically changed based upon the operation of an array camera with a corresponding update to a group member list associated with the changed focal plane group. In certain embodiments, if focal planes are preprogramed to be in certain focal plane groups, a processor can reprogram and reassign focal planes to different focal plane groups. In particular embodiments, focal plane groups need not be of any specific number and therefore the reprograming and reassigning of focal plane groups can occur with a different number of focal plane groups and/or different constitutions of focal planes within the focal plane groups. In various embodiments, certain focal planes can be part of numerous groups, for example a focal plane can be a member of a focal plane group with a specified gain parameter and a focal plane group that is also on standby. In many embodiments, the assignments of focal planes to focal plane groups are limited such that the assignments do not call for the focal planes to perform in an impossible manner.

In numerous embodiments, control (306) of focal plane groups occurs by changing the parameters associated with focal planes within a group. In several embodiments, the parameters of the focal planes within a focal plane group are changed by writing a new set of parameters to a virtual address associated with the focal plane group. Logic within the sensor maps the virtual address to physical registers associated with the focal planes within the focal plane group. In this way, a single command can be used to rapidly update the parameters of every focal plane within a focal plane group.

Figure 4:
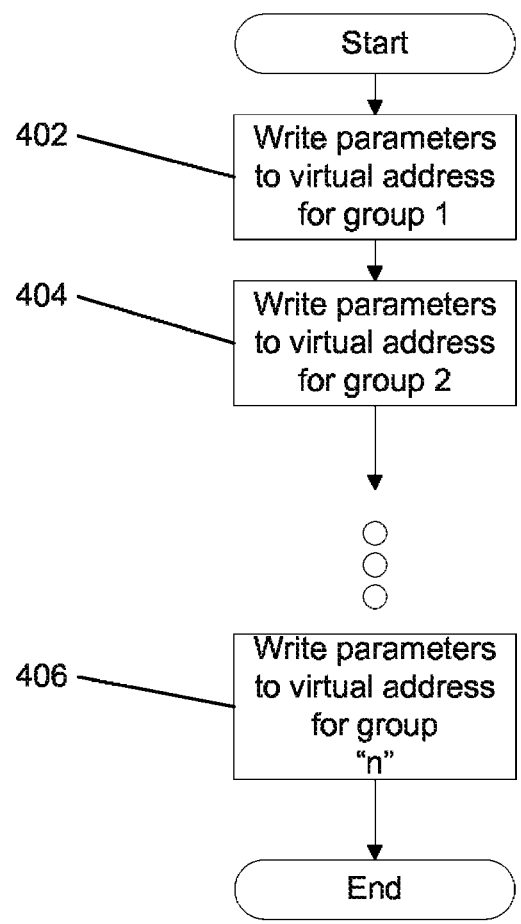
FIG. 4 illustrates a process for controlling an arbitrary number of focal plane groups in accordance with an embodiment of the invention.

A process for controlling an arbitrary number of focal plane groups, where each focal plane group has an associated virtual address, in accordance with an embodiment of the invention is illustrated in FIG. 4. The process includes controlling (402) focal plane group 1 by writing a new set of parameters to a first virtual address associated with group 1, and controlling (404) focal plane group 2 by writing a new set of parameters to a second virtual address associated with group 2. Parameters are written to a separate virtual address associated with each of the focal plane groups until parameters controlling (406) the focal planes in focal plane group "n" are written to the virtual address associated with focal plane group "n." In the illustrated embodiment, the control process writes parameters to at least one virtual address associated with each focal plane group sequentially. In many processes, the sensor is configured to enable a processor to randomly write parameters to virtual addresses associated with specific focal plane groups.

While the above description contains many specific embodiments of the invention, these should not be construed as limitations on the scope of the invention, but rather as an example of one embodiment thereof. For example, although certain circuits for performing focal plane group control are discussed above, many other circuits for performing focal plane group control can be utilized beyond the specific embodiments mentioned, including (but not limited to) circuits configured to control focal plane groups where different focal planes utilize different sensor elements or different numbers of sensor elements or where certain focal plane groups include a plurality of focal planes and other focal plane groups include only one focal plane. Accordingly, the scope of the invention should be determined not by the embodiments illustrated, but by the appended claims and their equivalents.

What is claimed:

1. An imaging sensor configured to capture a plurality of images using a plurality of focal planes, comprising:
   a plurality of focal planes, where each focal plane comprises a plurality of rows of pixels that also form a plurality of columns of pixels and each focal plane is contained within a region that does not contain pixels from another focal plane; and
   control circuitry configured to control the capture of image data by the pixels within the focal planes, where the control circuitry is configured so that the capture of image data by the pixels in at least two of the focal planes is separately controllable;
   wherein the control circuitry comprises a plurality of registers with associated register addresses;
   wherein the plurality of registers comprises:
      a plurality of parameter registers, where a given parameter register is associated with one of the plurality of focal planes and contains configuration data for the associated focal plane; and
      a focal plane group register that contains data identifying focal planes from the plurality of focal planes that belong to a focal plane group;
   wherein the control circuitry is further configured to:
      receive commands to write data to and read data from register addresses via an interface;
      map a virtual register address to the addresses of the parameter registers associated with the focal planes that belong to the focal plane group;
      modify the parameter registers associated with the focal planes in the focal plane group in response to receiving a command to write a value to the virtual register address via the interface; and
      control imaging parameters of the plurality of focal planes based upon the configuration data in the parameter register associated with each of the plurality of focal planes.

2. The imaging sensor of claim 1, wherein the control circuitry is further configured to modify the data in the focal plane group register to change the focal planes from the plurality of focal planes that are identified as forming the focal plane group in response to receiving a command to write a value to the register address of the focal plane group register via the interface.

3. The imaging sensor of claim 2, wherein the focal plane group register contains a list of the focal planes in the focal plane group.

4. The imaging sensor of claim 1, wherein the focal plane group register is one of a plurality of focal plane group registers and each focal plane group register contains data identifying focal planes from the plurality of focal planes that belong to a specific focal plane group.

5. The imaging sensor of claim 4, wherein the plurality of focal plane group registers is configured so that a given focal plane belongs to a plurality of different focal plane groups.

6. The imaging sensor of claim 4, wherein the control circuitry is configured to prevent the plurality of focal plane group registers from being configured so that a given focal plane belongs to a predetermined set of focal plane groups.

7. The imaging sensor of claim 1, wherein the configuration data in a given parameter register controls integration time of pixels in the focal plane associated with the given parameter register.

8. The imaging sensor of claim 1, wherein the configuration data in a given parameter register controls a gain applied to pixel outputs of pixels in the focal plane associated with the given parameter register.

9. The imaging sensor of claim 1, wherein the configuration data in a given parameter register controls focal plane operational state of the focal plane associated with the given parameter register.

10. The imaging sensor of claim 1, further comprising:
at least one system descriptor register, where the at least one system descriptor register contains system descriptor data describing the imaging sensor; and
wherein the control circuitry is configured to receive instructions to read data from the at least one system descriptor register via the interface.

11. The imaging sensor of claim 10, wherein the system descriptor data includes at least one piece of data selected from a group consisting of information identifying:
a type of imaging sensor;
a version of the imaging sensor,
a communication protocol supported by the imaging sensor;
an imaging sensor hardware manufacturer;
a hardware manufacturer's model and version;
the number of the plurality focal planes;
a layout for the plurality of focal planes;
an initial imaging sensor configuration;
default focal plane groups for the plurality of focal planes;
default integration times for default focal plane groups; and
default gains for default focal plane groups.

12. The imaging sensor of claim 1, further comprising at least one color filter applied to the pixels on at least one focal plane.

13. The imaging sensor of claim 12, wherein the at least one color filter applied to the pixels on at least one focal plane forms a Bayer pattern on at least one focal plane.

14. The imaging sensor of claim 13, wherein the at least one color filter applied to the pixels on at least one focal plane are applied so that the pixels of at least one of the plurality of focal planes are configured to capture image data from the same discrete portion of the electromagnetic spectrum.

15. The imaging sensor of claim 1, wherein:
the focal plane group register is one of a plurality of focal plane group registers and each focal plane group register contains data identifying focal planes from the plurality of focal planes that belong to a specific focal plane group;
the control circuitry is further configured to modify the data in a given focal plane group register to change the focal planes that are identified as forming the focal plane group in response to receiving a command to write a value to the register address of the given focal plane group register via the interface;
and the configuration data in a given parameter register controls:
a focal plane operational state of the focal plane associated with the given parameter register;
integration time of pixels in the focal plane associated with the given parameter register;
and a gain applied to pixel outputs of pixels in the focal plane associated with the given parameter register.

16. A method of configuring imaging parameters of a plurality of focal planes on an imaging sensor, where each focal plane comprises a plurality of rows of pixels that also form a plurality of columns of pixels and each focal plane is contained within a region of the imaging sensor that does not contain pixels from another focal plane, the method comprising:
receiving a command to write data to a virtual register address via an interface;
mapping the virtual register address to at least one physical address based upon data identifying focal planes from the plurality of focal planes that belong to a focal plane group stored in a focal plane group register associated with the virtual address using control circuitry;
modifying configuration data stored in parameter registers associated with the focal plane groups in response to the instruction to write data to a virtual register address using the control circuitry;
and controlling imaging parameters of pixels within the plurality of focal planes based upon configuration data stored in the parameter registers associated with each of the plurality of focal planes using the control circuitry.

17. The method of claim 16, further comprising:
receiving a command to write a value to a register address associated with the focal plane group register via the interface;
and modifying the data in the focal plane group register to change the focal planes from the plurality of focal planes that are identified as forming the focal plane group in response to the command using the control circuitry.

18. A method of capturing imaging data using an imaging sensor comprising a plurality of focal planes, where each focal plane comprises a plurality of rows of pixels that also form a plurality of columns of pixels and each focal plane is contained within a region that does not contain pixels from another focal plane, the method comprising:
assigning multiple focal planes from the plurality of focal planes to a focal plane group by outputting a command to an imaging sensor interface to write a value to a register address associated with a focal plane group register on the imaging sensor using a processor configured by array camera software;
controlling imaging parameters for the multiple focal planes assigned to the focal plane group by outputting a command to the imaging sensor interface to write a value to a virtual address using the processor configured by the array camera software;
and receiving imaging data from the imaging sensor via the imaging sensor interface, where the imaging data includes imaging data captured by the multiple focal planes assigned to the focal plane group using imaging parameters determined based upon the command to write the value to the virtual address.

19. The method of claim 18, further comprising:
receiving at least one system descriptor from the imaging sensor via the imaging sensor interface using the processor configured by the array camera application; and determining the number of focal planes in the plurality of focal planes based upon the at least one system descriptor using the processor configured by the array camera application.

20. The method of claim 19, further comprising determining the layout of the plurality of focal planes based upon the at least one system descriptor using the processor configured by the array camera application.

* * * * *